United States Patent
Katsume et al.

(10) Patent No.: US 7,887,416 B2
(45) Date of Patent: Feb. 15, 2011

(54) ONLINE GAME SYSTEM AND ONLINE GAME PROGRAM

(75) Inventors: Yoshitaka Katsume, Tokyo (JP); Nobutaka Nishioka, Kanagawa (JP); Yusuke Inaba, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 140 days.

(21) Appl. No.: 12/273,591

(22) Filed: Nov. 19, 2008

(65) Prior Publication Data

US 2009/0137321 A1    May 28, 2009

(30) Foreign Application Priority Data

Nov. 22, 2007  (JP)  ............................. 2007-302858

(51) Int. Cl.
A63F 13/10 (2006.01)
A63F 13/12 (2006.01)
G06F 17/40 (2006.01)

(52) U.S. Cl. .............................. 463/29; 463/42; 463/43
(58) Field of Classification Search ................... 463/42
See application file for complete search history.

(56) References Cited

U.S. PATENT DOCUMENTS

| | | |
|---|---|---|
| 2004/0087371 A1 | 5/2004 | Yamana et al. |
| 2004/0087372 A1 | 5/2004 | Yamana et al. |
| 2004/0087373 A1 | 5/2004 | Choi |
| 2005/0144254 A1* | 6/2005 | Kameda ..................... 709/217 |
| 2006/0136964 A1 | 6/2006 | Diez et al. |
| 2007/0004507 A1 | 1/2007 | Nakajima et al. |
| 2007/0054717 A1 | 3/2007 | Youm et al. |
| 2008/0300060 A1 | 12/2008 | Tomita |

FOREIGN PATENT DOCUMENTS

| | | |
|---|---|---|
| JP | 2001-198363 | 7/2001 |
| JP | 2001-212366 | 8/2001 |
| JP | 2002-291248 | 10/2002 |

(Continued)

OTHER PUBLICATIONS

Dalheimer, Matthias Kalle, Lar Kaufman, and Matt Welsh, "Running Linux", Aug. 1, 1999, 3rd Edition.*

(Continued)

Primary Examiner—David L Lewis
Assistant Examiner—Werner Garner
(74) Attorney, Agent, or Firm—Greenblum & Bernstein P.L.C.

(57) ABSTRACT

In an online game server, an updater updates at least one of a game program and game data for server stored in a storage section in accordance with an update operation for data to be utilized when to execute a sub game other than a main game in an online game. Updated portion data are a shared library format that can be utilized in the client terminal. A transmitter transmits updated data including at least the updated portion data to the client terminal. In a client terminal, a rewriter rewrites at least one of a game program and game data for client stored in a memory. In the case where there is a specification operational input by a player, a controller controls progress of the online game using the game program or the game data for client without carrying out communication with the online game server.

8 Claims, 6 Drawing Sheets

FOREIGN PATENT DOCUMENTS

WO          2005/020122          3/2005

OTHER PUBLICATIONS

English language Abstract of JP 2001-198363, Jul. 24, 2001.
English language Abstract of JP 2002-291248, Oct. 8, 2002.
English language Abstract of JP 2001-212366, Aug. 7, 2001.
Stephane Faroult, "The Art of SQL: SQL Programming Method drawing out Performances" (in Japanese), Tetsuya Kinoshita translated, Sep. 12, 2007, First Edition, O'reilly Japan Inc., pp. 182-186 (Especially on Section of "Loopback" in "8.3 Distribution System," pp. 182-183.).

* cited by examiner

ONLINE GAME SYSTEM AND ONLINE GAME PROGRAM

CROSS-REFERENCE TO RELATED APPLICATION

The present disclosure relates to subject matter contained in Japanese Patent Application No. 2007-302858, filed on Nov. 22, 2007, the disclosure of which is expressly incorporated herein by reference in its entirety.

BACKGROUND OF THE INVENTION

1. Field of the Invention

The present invention relates to a technique to carry out various processes concerned with an online game between a client terminal and an online game server via a communication network.

2. Description of the Related Art

Heretofore, a type of an online game in which various processes are carried out between a client terminal and an online game server via a communication network to play the online game is spread. In such an online game, in order to prevent bad analysis and modification of various programs and various game data for carrying out the online game, these programs and game data are managed at the online game server side.

However, since communication between the client terminal and the online game server is carried out whenever it is required on progress of the online game, it particularly takes much time to transmit and receive data when processes of the online game server are crowded or a communication environment is not good. This causes progress of the online game to be delayed, whereby the player may be subjected to stress.

Thus, for example, a data processing method, in which at progress of the online game the online game server transmits data on developed portion of the online game to an extent to the client terminal as a whole at start of the online game or appropriate timing in the middle of the online game, whereby an operation with a low degree of importance related to progress of the online game (that is, operation that does not influence progress of a scenario largely) is carried out without communication to cause the online game to progress, has been known (for example, see Japanese Patent Application Publication No. 2001-198363).

However, in the conventional data processing method described above, there has been a problem that it takes time for processing because access to a server is concentrated once and therefore a communication load is heightened at reading of data on the way of the online game or the like, and it is not enough for the player to reduce his or her stress due to delay of the progress on the way of the online game.

SUMMARY OF THE INVENTION

It is one object of the present invention to solve the problems described above and to provide an online game system and an online game program in which a stand-alone operation is achieved in a client terminal by transmitting predetermined data on an online game to the client terminal from an online game server in advance, whereby it is possible to reduce a communication load in game progress of the online game.

Further, it is another object of the present invention to prevent a mistake such as losing of data update by hand work when an online game provider carries out update of various data in the online game, whereby a work burden can be reduced.

In order to achieve the above object, one aspect of the present invention is directed to an online game system. The online game system of the present invention includes a client terminal operated by a player and an online game server. In this case, the online game server executes an online game played in the client terminal via a communication network. The online game server includes a storage section that stores a game program for server of the online game and game data for server to be utilized for the game program for server.

The online game server also includes an updater that updates at least one of the game program for server and the game data for server stored in the storage section in accordance with an update operation for data to be utilized when to execute a sub game other than a main game in the online game, and makes updated portion data indicating data of an updated portion by update of the data to be a shared library format that can be utilized in the client terminal.

The online game server also includes a transmitter that transmits updated data including at least the updated portion data made to be the shared library format by the updater to the client terminal.

Further, the client terminal includes a memory that memorizes a game program for client of the online game supplied from the online game server and game data for client utilized for the game program for client therein.

The client terminal also includes a receiver that receives the updated data transmitted by the transmitter.

The client terminal also includes a rewriter that rewrites at least one of the game program for client memorized in the memory and the game data for client using the updated data received by the receiver.

The client terminal also includes a controller that, in the case where there is a specification operational input by the player that uses data on the sub game of the game program for server or the game data for server, controls progress of the online game using the game program for client or the game data for client memorized in the memory without carrying out communication with the online game server.

Since the online game server has the configuration described above, it is possible to achieve a stand-alone operation in the client terminal, whereby a communication load can be reduced. Further, since the updated data including the updated portion data updated in the online game server are rewritten in the client terminal in the state where the updated data are caused to be the utilizable shared library format in the client terminal, it is possible to prevent a mistake such as losing of data update of an online game provider, whereby a work burden can be reduced.

In the online game system according to the present invention, it is preferable that the updated data are part or all of data to be utilized when to execute the sub game of the game program for server and the game data for server.

In the online game system according to the present invention, it is preferable that the online game server further includes a data transmitting request receiver that receives a data transmitting request with an authentication flag related to transmission of the updated data from the client terminal, and that the transmitter determines whether the authentication flag corresponds with a confirmation flag attached to the updated data or not on the basis of the data transmitting request with the authentication flag received by the data transmitting request receiver, and transmits the updated data to the client terminal in accordance with a determination result.

In the online game system according to the present invention, it is preferable that the client terminal further comprises an operated input information transmitter that transmits operated input information based on the specification operational input by the player to the online game server, and that, in the case where there is the specification operational input by the player that uses data on the sub game of the game program for server or the game data for server, the controller replaces reference target specification information of data utilized for a process based on the operated input information from specification to the game program for server or the game data for server to specification to the game program for client or the game data for client, and executes a loopback process, thereby controlling progress of the online game.

Further, in another aspect of the present invention, the present invention is directed to an online game program product for causing a client terminal operated by a player and an online game server to execute various processes related to an online game. In this case, the online game server executes the online game played in the client terminal via a communication network. The online game program product causes the online game server to execute an update process for updating at least one of a game program for server and the game data for server stored in a storage section, with which the online game server is provided, in accordance with an update operation for data to be utilized when to execute a sub game other than a main game in the online game, and makes updated portion data indicating data of an updated portion by update of the data to be a shared library format that can be utilized in the client terminal.

The online game program product also causes the online game server to execute a transmit process for transmitting updated data including at least the updated portion data made to be the shared library format to the client terminal in the update process.

Further, the online game program product causes the client terminal to execute a reception process for receiving the updated data transmitted in the transmit process.

The online game program product also causes the client terminal to execute a rewrite process for rewriting at least one of the game program for client memorized in a memory, with which the client terminal is provided, and the game data for client using the updated data received by the receiver.

The online game program product also causes the client terminal to execute a control process for, in the case where there is a specification operational input by the player that uses data on the sub game of the game program for server or the game data for server, controlling progress of the online game using the game program for client or the game data for client memorized in the memory, with which the client terminal is provided, without carrying out communication with the online game server.

According to the present invention, it is possible to reduce a communication load in progress of a game by achieving a stand-alone operation at a client terminal. Further, it is possible to reduce a work burden while preventing a mistake such as losing of data update of an online game provider.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

DETAILED DESCRIPTION OF THE INVENTION

An embodiment of an online game system and an online game program according to the present invention will now be described in detail with reference to the appending drawings.

Figure 1:
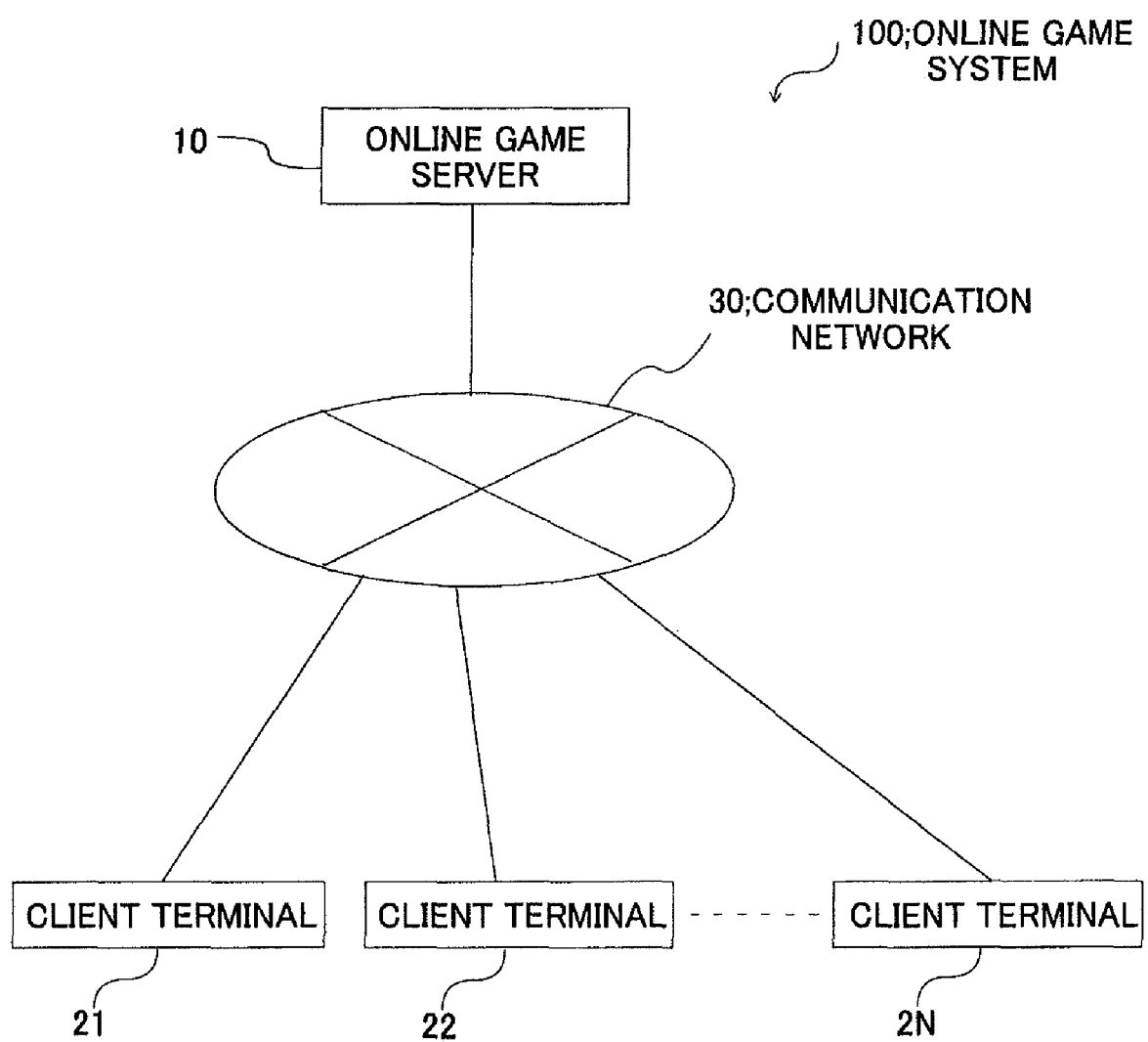
FIG. 1 is a block diagram that shows an example of a configuration of an online game system according to an embodiment of the present invention.

FIG. 1 is a block diagram that shows an example of a configuration of an online game system according to an embodiment of the present invention. As shown in FIG. 1, an online game system 100 includes an online game server 10 and a plurality of client terminals 21 to 2N ("N" is an arbitrary integer).

Each of the online game server 10 and the plurality of client terminals 21 to 2N that constitute this online game system 100 is connected to a communication network 30 such as the Internet, for example.

The online game server 10 is managed by a system administrator (online game provider) of the present online game system 100, for example. The online game server 10 has various functions for supplying an online game to each of the client terminals 21 to 2N and executing the online game. This online game server 10 is configured by an information processing apparatus such as a WWW server. In this regard, the online game server 10 may be provided with a display apparatus having a display section (display screen) of an image, which is configured by a television apparatus, a liquid crystal display or the like, inside or outside the online game server 10.

Each of the client terminals 21 to 2N is managed by a player (user) who carries out (plays) the online game, for example. Each of the client terminals 21 to 2N is configured by an information processing apparatus such as a personal computer and a mobile communication terminal. Each of the client terminals 21 to 2N is provided with hardware such as a communication module for connecting to the communication network 30 and software such as communication software. Each of these client terminals 21 to 2N is provided with a display apparatus having a display section (display screen) of an image, which is configured by a television apparatus, a liquid crystal display or the like, inside or outside the corresponding client terminal 21 to 2N.

Here, the online game in the present embodiment is supplied to the client terminals 21 to 2N from the online game server 10 via the communication network 30 by means of download (DL) or the like, for example. The online game is a game played in each of the client terminals 21 to 2N by means of operations of the player. Further, the online game in the present embodiment is a game in which a sub game directly unconcerned to progress of a main scenario automatically along progress of a main game that constitutes the main scenario or when objects selectably displayed in a game display screen, such as items, is arbitrarily selected.

Figure 2:
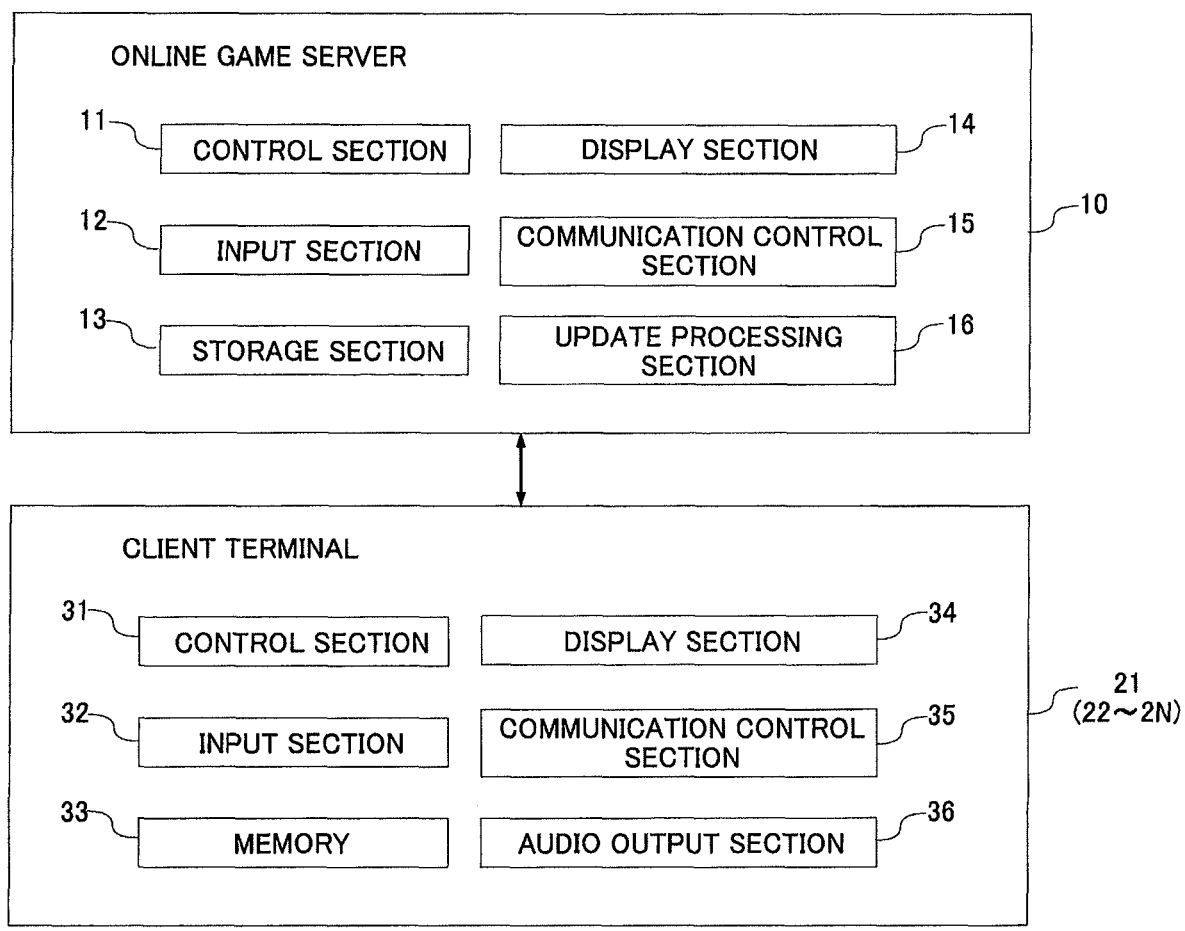
FIG. 2 is a block diagram that shows an example of a configuration of each of the online game server and a client terminal.

FIG. 2 is a block diagram that shows an example of a configuration of each of the online game server 10 and the client terminals 21 to 2N. As shown in FIG. 2, the online game server 10 includes a control section 11, an input section 12, a storage section 13, a display section 14, a communication control section 15, and an update processing section 16. Further, each of the client terminals 21 to 2N includes a control section 31, an input section 32, a memory 33, a display section 34, a communication control section 35 and an audio output section 36.

The control section 11 of the online game server 10 includes a CPU, a ROM, a RAM and the like. The control section 11 carries out control of the whole online game server 10 in accordance with a control program, for example, of various programs and data such as game programs for server stored in the storage section 13 and game data for server to be utilized for this game program for server.

The input section 12 is configured by various input devices such as a remote control, a keyboard, a mouse, a touch panel and a joystick. The input section 12 receives input to the online game server 10, such as various instructions along with characters, numerical values and operational inputs.

The storage section 13 is configured by a storage apparatus such as a magnetic disk drive for magnetic disks and an optical disc drive for optical discs, or a database apparatus, for example. The storage section 13 is a memory medium in which various programs and data described above are stored. This storage section 13 may be detachably provided with the online game server 10, and be a memory medium such as a memory card, for example.

The display section 14 is configured by a television apparatus or a liquid crystal display as described above. The display section 14 displays various data, such as images, characters, icons, menus, cursor(s) and windows, on the display screen.

The communication control section 15 is connected to the communication network 30 via a wireless line or a wired line. The communication control section 15 functions as an interface (I/F) between the control section 11 and the communication network 30, and controls overall communication (transmission and reception) of various data with each of the client terminals 21 to 2N. Moreover, the update processing section 16 carries out processes related to various programs stored in the storage section 13 and update of data in accordance with input received by the input section 12 along with an update operation by the online game provider, for example. An update process will be described in detail later separately.

On the other hand, the control section 31 of each of the client terminals 21 to 2N includes a CPU, a ROM, a RAM and the like. The control section 31 carries out control of the whole client terminal 21 to 2N related to progress of the online game in accordance with an online game program, for example, of various programs and data such as game programs for client and game data for client to be utilized for the game programs for client, which are supplied from the online game server 10 and stored in the memory 33.

The input section 32 is configured by various input devices as well as the input section 12 of the online game server 10 described above. The input section 32 receives input to the corresponding client terminal 21 to 2N such as various operations and instructions related to the online game, for example.

The memory 33 is a memory medium in which various programs and data described above are stored as well as the storage section 13 of the online game server 10 described above. This memory 33 may be detachably provided with each of the client terminals 21 to 2N, and be a memory medium such as a memory card, for example.

The display section 34 displays various data such as images on a display screen as well as the display section 14 of the online game server 10 described above.

The audio output section 36 is configured by a speaker apparatus or the like that outputs audio data related to the online game, which are generated by the control section 31 along with execution of the online game program, as an audio (voice) for example.

In this regard, the online game according to this embodiment is roll playing type one having an object that in a game world established in a virtual three-dimensional space a player operates a player character to clear various traps and experience battles, whereby the game proceeds to accomplish a predetermined aim, such as an MORPG (Multi-player Online Role-Playing Game) and an MMORPG (Massively Multiplayer Online Role-Playing Game), for example.

In the online game, various data necessary for progress of the game are one stored in the online game server 10 and one stored in each of the client terminals 21 to 2N. The data stored in each of the client terminals 21 to 2N are mainly control data utilized chiefly when operational information inputted from the input section 32 by the player is transmitted to the online game server 10 or information received from the online game server 10 is displayed on the display section 34. On the other hand, the data stored in the online game server 10 are computational expressions for carrying out various operations (calculations) on the basis of the operational information received from each of the client terminals 21 to 2N, status information of each player character and the like, and recorded and stored in the online game server 10.

As described above, the information stored in the online game server 10 is data that require higher security compared with the information stored in each of the client terminals 21 to 2N. This is for an object to prevent a malicious player to carry out analysis and modification. For this reason, the online game provider does not allow the client terminals 21 to 2N to download important information necessary for progress of the online game. It is desired that various data necessary for progress of the online game are concentrated in the online game server 10 as much as possible to heighten security thereof by appropriately transmitting and receiving only necessary information through communication with the online game server 10 whenever the player instructs operations.

In the present embodiment, data on a portion directly unconcerned to progress of the main scenario have low necessity to keep a high security state like the sub game described above, and each of the client terminals 21 to 2N is allowed to download the data. This causes the data such as the sub game to require no communication between each of the client terminals 21 to 2N and the online game server 10. The game is caused to proceed by means of exchange of information in the data stored in each of the client terminals 21 to 2N, whereby a stand-alone operation can be achieved. Therefore, it is possible to reduce the number of communication between the online game server 10 and each of the client terminals 21 to 2N, and to reduce a communication load. Hereinafter, processes when carrying out a tutorial mode will be described in detail as an example.

The tutorial mode is provided for explaining a basic battle operation of the player character (character operated by the player) required in a battle scene of the main game to the player, and for causing the player to practice the operations until the player can operate the player character well to an extent by causing the player to execute a concrete example unrelated to the scenario of the game, for example. By executing this tutorial mode, the player can operate a battle action against an enemy character and the like required for progress of the main scenario smoothly from the first time.

Figure 3:
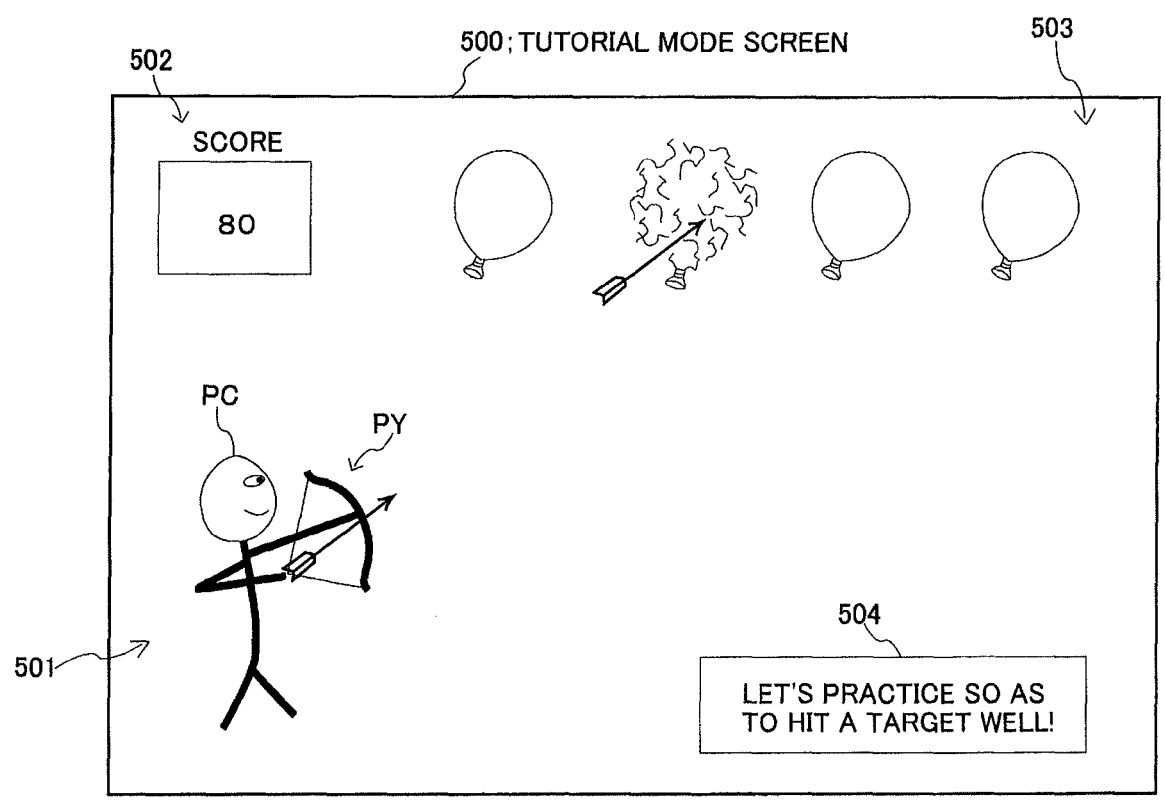
FIG. 3 is an explanatory drawing for explaining an example of a sub game in the online game system.

FIG. 3 is an explanatory drawing for explaining an example of a sub game in the online game system 100 according to the present embodiment. As shown in FIG. 3, the sub game here is a tutorial mode for carrying out practice in an attack by a bow of the player character PC after start of the online game, for example. In this regard, this tutorial mode may be executed many times during execution of the online game.

In a tutorial mode screen 500, a character display region 501, a point display region 502, a target display region 503 and a message display region 504 are provided. When a tutorial mode is executed, the character display region 501 is switched from a screen of the main game (not shown in the drawings) to be displayed on the display screen of the display section 34, for example, in which the player character PC holding a bow PY is displayed. Marks (score) of shooting are displayed in the point display region 502. A plurality of targets such as balloons are displayed in the target display region 503. For example, a message displayed sentence such as "Let's practice so as to hit a target well!" is displayed in the message display region 504.

In this tutorial mode screen 500, the player operates the player character PC to practice hitting a target displayed in the target display region 503 using a bow PY. In this regard, at this tutorial mode, battle parameters applied to the player character PC (for example, offensive power, defensive power, quickness and the like) are separately set so as not to influence battle parameters used for a battle mode in the online game. More specifically, for example, offensive power of the player character increases by +5% when one attack succeeds in a battle mode, while in the tutorial mode offensive power is not changed and a battle parameter is applied so as to calculate (and add) marks even when an attack succeeds.

As described above, the data required in execution of the tutorial mode uses a parameter different from one in execution of the main scenario. Therefore, it is thought that an important problem hardly occurs by distributing the data to the client terminals because important information directly related to the main scenario of the online game is not included therein even in the case where a malicious player analyzes the data.

Figure 4:
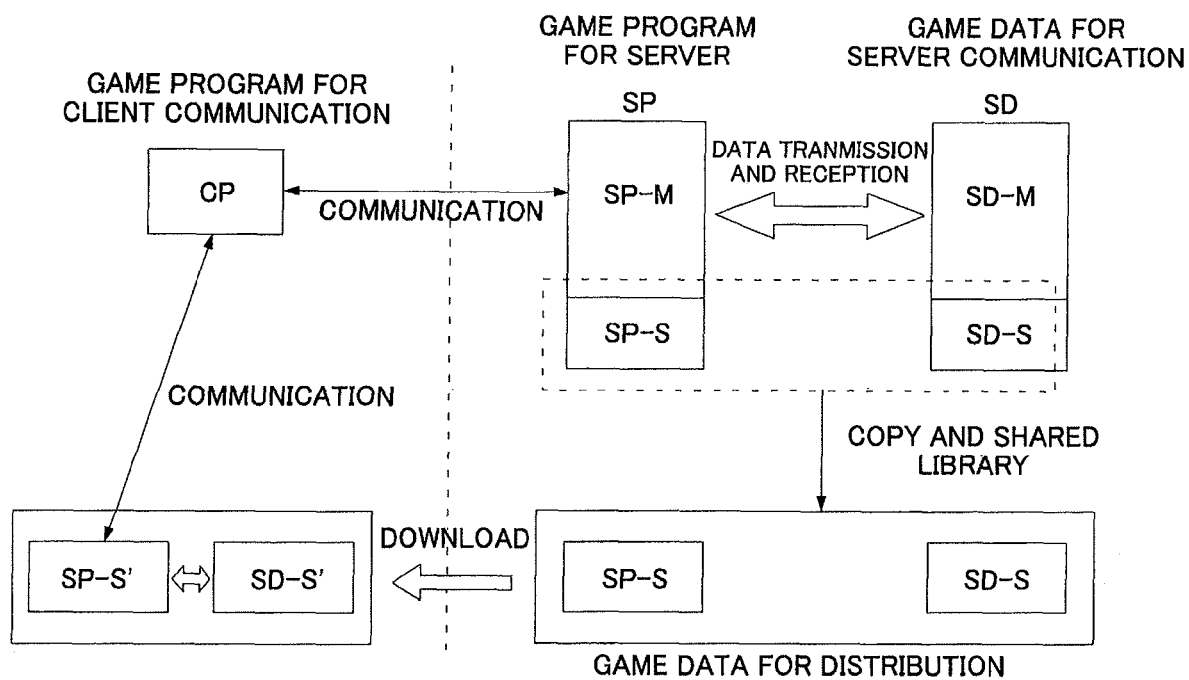
FIG. 4 is an explanatory drawing for explaining a method of distributing game data with a low degree of importance to the client terminal in the online game system.

Hereinafter, a method of distributing game data with a low degree of importance, such as a sub game including a tutorial mode, to client terminals will be described with reference to FIG. 4. As described above, the game provider determines whether each of data can be transmitted to each of the client terminals 21 to 2N on the basis of height of security desired to the data. The game provider recognizes data with a low degree of importance as "transmittable" because high security is not required, and sets a transmittable flag thereto. To be expressed conceptually, as shown in FIG. 4, information at online game server 10 side is constructed from a game program for server SP and game data for server SD by being roughly classified. Moreover, these are subdivided, depending on presence or absence of the transmittable flag described above, into a game program for server (main) SP-M, which is information concerned to the main scenario that cannot be transmitted to each of the client terminals 21 to 2N, game data for server (main) SD-M, a game program for server (sub) SP-S, which is other information that can be transmitted, and game data for server (sub) SD-S.

The game program for server (sub) SP-S and the game data for server (sub) SD-S to which the transmittable flag is set are automatically copied, and stored as a set for game data for distribution to each of the client terminals 21 to 2N in another place on the online game server 10. The game data for distribution are transmitted to each of the client terminals 21 to 2N by a method (will be described later) and stored therein. In this regard, the set of game data for distribution may be stored in a shared library format. As this shared library format, for example, a DLL (Dynamic Link Library) format and the like may be mentioned in the case where an operating system (OS) is Windows (registered trademark).

In each of the client terminals 21 to 2N, the game program for client is installed therein through a memory medium at start of the game for the first time, or downloaded from the online game server 10 to be stored in each of the client terminals 21 to 2N, and the game data for distribution described above are downloaded from the online game server 10 to be stored in each of the client terminals 21 to 2N. Then, by comparing the game data for distribution stored in the online game server 10 with version information on the data stored in each of the client terminals 21 to 2N every time at start of the game by a method (will be described later), the game data for distribution in the online game server 10 is again downloaded to be overwritten and saved in the data of each of the client terminal 21 to 2N automatically in the case where the game data for distribution in the online game server 10 is updated (that is, in the case where the version information is updated). In this case, a copy of the game data for distribution stored in each of the client terminals 21 to 2N is set to SP-S' and SD-S' as a matter of convenience.

In the case where the main scenario of the game is caused to progress, a game program for client CP carries out communication with the game program for server SP-M. In the case where other program such as the tutorial mode is executed, the game program for client CP carries out communication with the SP-S', whereby the game can be caused to progress in a stand-alone state without carrying out communication with the online game server 10. In this case, by devising definition and the like of a file name at download and storage of the game data for distribution, switching to communication destination at transition to a stand-alone mode can be carried out further effectively using a mechanism of loop back. This will be described later.

Figure 5:
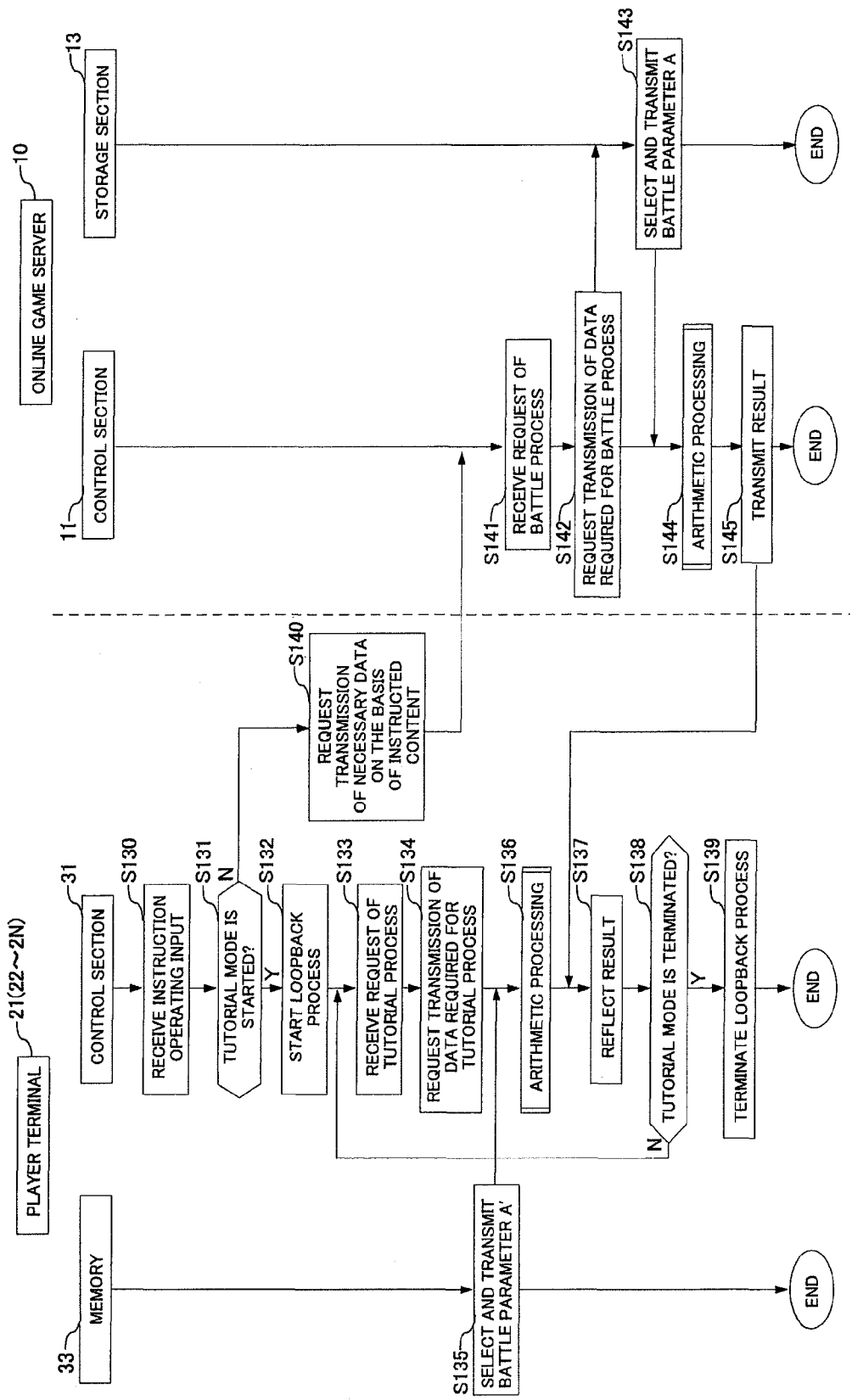
FIG. 5 is a flowchart that illustrates an example of an operation of the online game in the online game system.

FIG. 5 is a flowchart that illustrates an example of an operation of the online game in the online game system 100 according to the present embodiment. As shown in FIG. 5, the control section 31 of one of the client terminals 21 to 2N receives instruction operating input of the player inputted by the input section (Step S130), and determines whether the received instruction operating input is an instruction to start a tutorial mode or not (Step S131).

In the case where it is determined at Step S131 that the instruction operating input is not the instruction to start the tutorial mode ("No" at Step S131), the control section 31 determines execution of the program related to the main scenario, and requests the control section 11 of the online game server 10 to transmit necessary data on the basis of instruction content via the communication control section 35 (Step S140). Thus, the control section 11 of the online game server 10 (specifically, the game program for server SP-M) requests the storage section 13 (specifically, the game data for server SD-M) to transmit the necessary data.

For example, in the case where operation instruction from the player is to start a battle process, the control section 11 of the online game server 10 receives a request of the battle process in accordance with such a request for transmission (Step S141), and requests the storage section 13 to transmit necessary data such as status information of the player character and battle parameters required for the battle process (Step S142). Then, after receiving such a data transmitting request, the storage section 13 selects and transmits a battle parameter A, for example, as the data necessary for a battle program (Step S143).

After the battle parameter A is transmitted, the control section 11 carries out arithmetic processing for a battle action (Step S144), and transmits an operation result to the control section 31 of the corresponding client terminal 21 to 2N via the communication control section 15 (Step S145). When the operation result is transmitted from the online game server 10, the control section 31 of the corresponding client terminal 21 to 2N reflects the result by displaying an image based on the operation result on the display screen of the display section 34 (Step S138).

On the other hand, in the case where it is determined at Step S130 that the content of the instruction operating input received from the player is the instruction to start the tutorial mode ("Yes" at Step S131), the control section 31 can utilize the mechanism of loop back by changing a destination address of the received instruction operating input into its own terminal's address. The loop back means communication in which transmission and reception of data are carried out in the same host by setting a destination address of the data to its own terminal's address (loopback address) to transmit the data. The loop back is a mechanism in which no packet flow in an actual network although it seems to access a network in view of software. Namely, this causes each of the client terminals 21 to 2N not to carry out communication with the online game server 10, but to refer to a copy of the game data for distribution stored in the memory 33 of its own client terminal (that is, SP-S'). This can easily be achieved by not changing a file name to be stored when the game data for distribution stored in the online game server 10 is downloaded in each of the client terminals 21 to 2N. When the loopback process is started (Step S132), the SP-S' receives a request of the tutorial process (Step S133), and requests the SD-S' stored in the memory 33 to transmit data necessary for the tutorial process (Step S134).

In the process at Step S132 described above, specifically, even though reference target specification of communication to a portion corresponding to instruction content included in the tutorial program of the online game server 10 becomes a state of pseudo communication with the SP-S in the online game server 10, data of a portion (that is, SP-S') corresponding to instruction content included in the tutorial program of each of the client terminals 21 to 2N are set to a reference target for communication. Therefore, the loop back is carried out. For example, after the content of the request of the transmitted data is execution of the tutorial battle process, the memory 33 selects a tutorial battle parameter A' as necessary data from tutorial data utilized in the stored tutorial program to transmit it (Step S135).

After the tutorial battle parameter A' is transmitted, the control section 31 (specifically, SP-S') carries out arithmetic processing for a tutorial action (Step S136), reflects a result by displaying an image based on the operation result on the display screen of the display section 34 or the like (Step S137), and determines whether the tutorial mode is to be terminated or not (Step S138).

In the case where it is determined that the tutorial mode is to be terminated ("Yes" at Step S138), the control section 31 returns the destination address of the instruction operating input to the address of the online game server 10, and the loop back is terminated (Step S139). A series of processes by this flowchart is then terminated. In the case where the tutorial mode is not to be terminated ("No" at Step S138), the processing flow shifts to Step S133 and the processes described above is repeated.

Thus, in the online game of the present embodiment, normally, in the tutorial mode operated in each of the client terminals 21 to 2N with stand-alone, by rewriting IP information of an address of the online game server 10 to which destination of the data from the corresponding client terminal 21 to 2N is set into IP information of the corresponding client terminal 21 to 2N itself (that is, loopback address), a reference target for the tutorial program and the tutorial data can be easily changed into the SP-S' and the SD-S' that are copy data of the data for distribution stored in the corresponding client terminal 21 to 2N. By carrying out communication with the data in the corresponding client terminal 21 to 2N as if the game program for client CP communicates with the online game server 10, the program of the sub game such as the tutorial mode can be caused to progress. For this reason, the operation of a very simple program allows a communication load between each of the client terminals 21 to 2N and the online game server 10 to be reduced. In particular, since most players start a new online game from execution of a tutorial mode immediately after sales of the new online game, a communication load for progress of the tutorial mode has been very large immediately after the sales of the game. However, it becomes possible to solve this problem very effectively.

In this regard, although the tutorial mode has been mentioned and explained as the sub game in the embodiment described above, a stand-alone operation using a loop-back process may be executed in operation of any kinds of games as a sub game different from a main game of the online game (that is, other than the main game) (for example, a mini game irrelevant to the scenario and the like).

Figure 6:
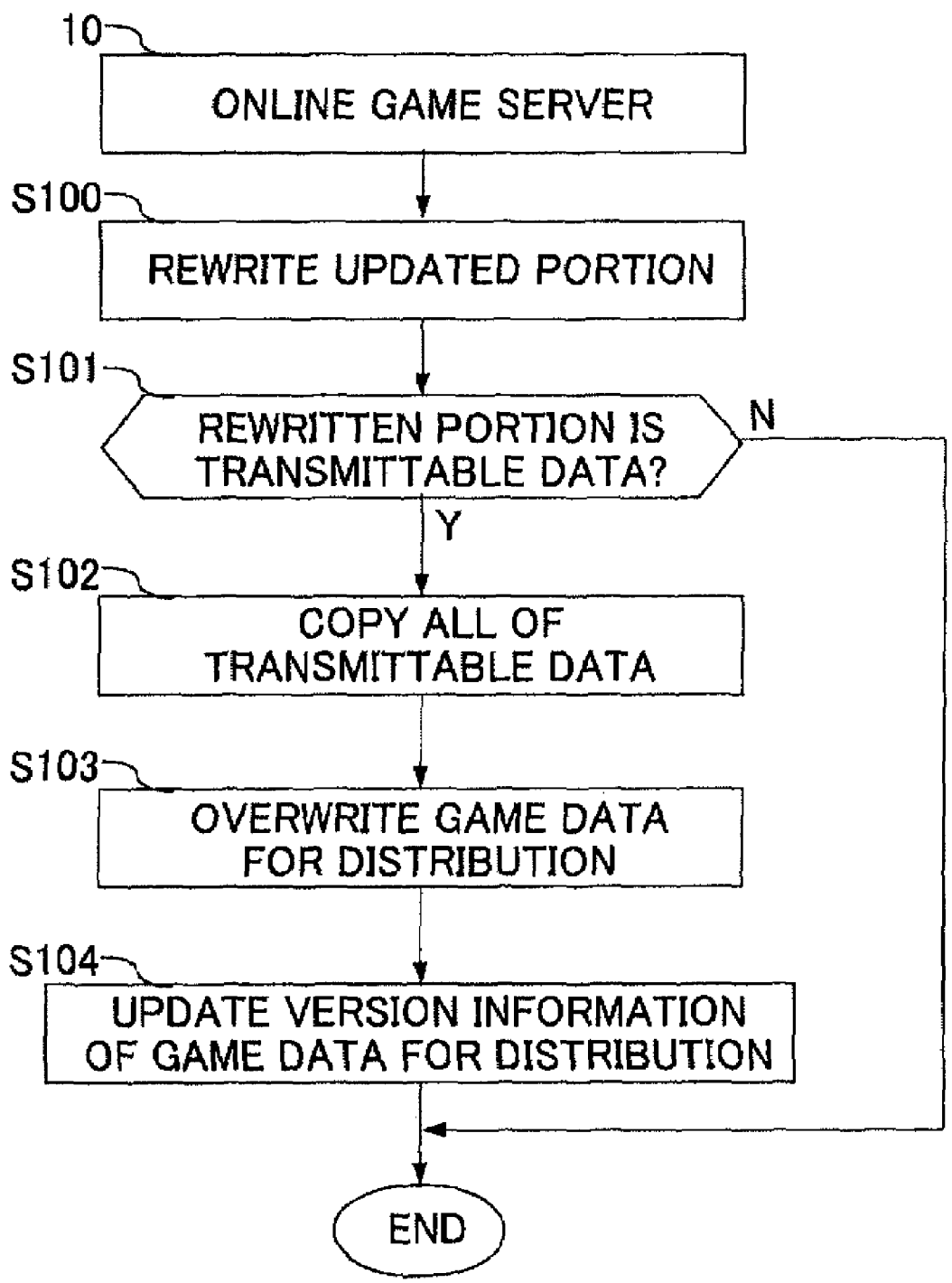
FIG. 6 is a flowchart that illustrates an example of procedures of a data update process in the online game system.

Next, an update process when any change in the game data stored in the online game server 10 is generated will be described. FIG. 6 is a flowchart that illustrates an example of procedures of a data update process in the online game system 100 according to the present embodiment. The data update process is started when input of data on update by an update operation of the input section 12 is received by the online game provider. In the data update process, the update processing section 16 of the online game server 10 first reflects the data modified by the update operation described above (revised data) to at least one of updated portion of the game program for server SP and the game data for server SD stored in the storage section 13 to rewrite the updated portion (Step S100).

Next, the update processing section 16 specifies the portion subjected to update (updated portion) with respect to the update process carried out for at least one of the game program for server SP and the game data for server SD, and determines whether the portion (rewritten portion) covers transmittable data or not (Step S101). In the case where it is determined that the update is carried out in the transmittable data ("Yes" at Step S101) the update processing section 16 copies all of the data to which the transmittable flag is set (that is, copies all of the transmittable data) (Step S102), and overwrites and saves them in the game data for distribution (SP-S, SD-S) stored in the online game server 10 (Step S103).

Moreover, the update processing section 16 updates version information on the newly overwritten game data for distribution and stores it (Step S104), whereby the update of the game data for distribution is completed. Each of the client terminals 21 to 2N compares the game data for distribution (SP-S', SD-S') downloaded and stored in the client terminal 21 to 2N with the version information of original data of the game data for distribution (SP-S, SD-S) stored in the online game server 10 whenever the online game starts. In the case where this version information does not correspond with the game data, by automatically downloading the game data for distribution stored in the online game server 10 again to be overwritten and saved in the client terminal 21 to 2N, the game data for distribution stored in the client terminal 21 to 2N are synchronized with the game data for distribution stored in the online game server 10, whereby version management is carried out. On the other hand, in the case where the portion subjected to the update process does not cover the transmittable data at all ("No" at Step S101), the update processing section 16 stores the update content and the update process is terminated.

By executing such a series of update processes, with respect to reflection of the update content to the game data for distribution stored on the online game server 10, in particular, the data to which the transmittable flag is set are automatically copied. Therefore, it is possible to prevent losing of update and the like due to a human-caused mistake, and it is possible to minimize a human-caused operation required for the update.

In this regard, although a method of copying the whole transmittable data including data not subjected to update to overwrite and save the whole game data for distribution in the case where the updated portion covers the transmittable data has been described in the embodiment described above, the data of at least updated portion may be copied and overwritten, and for example, the data of the updated portion may be copied with pinpoint accuracy and the content of the game data for distribution may be updated.

As explained above, in the embodiment described above, in the online game server 10, the game program for server SP of the online game and the game data for server SD to be utilized in this game program for server SP are stored in the storage section 13; the update processing section 16 updates at least one of the game program for server SP and the game data for server SD stored in this storage section 13 in accordance with the update operation for data to be used when to execute of the sub game other than the main game in the online game; updated portion data indicating data of the updated portion by this update of the data are made to be a shared library format (for example, DLL format) that can be utilized in each of the client terminals 21 to 2N; the communication control section 15 transmits the updated data SP-S, SD-S including at least the updated portion data made to be the shared library format by the update processing section 16 to each of the client terminals 21 to 2N, in each of the client terminals 21 to 2N, the game program for client CP of the online game supplied from the online game server 10 and the game data for client utilized for this game program for client CP are stored in the memory 33; the updated data SP-S, SD-S transmitted by the communication control section 15 are received via the communication control section 35; the control section 31 rewrites at least one of the game program for client CP and the game data for client stored in the memory 33 using the updated data SP-S, SD-S received via the communication control section 35; and the control section 31 controls progress of the online game using the game program for client CP or the game data for client stored in the memory 33 without carrying out communication with the online game server 10 in the case where there is the specification operational input by the player that uses the data of the sub game of the game program for server SP or the game data for server SD. Thus, a stand-alone operation at each of the client terminals 21 to 2N can be achieved and a communication load can be reduced. Further, the updated data SP-S, SD-S including the updated portion data updated in the online game server 10 are rewritten in each of the client terminals 21 to 2N in the state where they are caused to be the shared library format that can be utilized in each of the client terminals 21 to 2N. Thus, it is possible to prevent a mistake such as losing of the data update of the online game provider, and a work burden can be reduced.

Further, although each of the client terminals 21 to 2N downloads the game data for distribution on the basis of the version information of the data to which the transmittable flag is set by the online game server 10 in the embodiment described above, it may be constructed as follows. Namely, in the online game server 10, a data transmitting request with an authentication flag related to transmission of the updated data SP-S, SD-S from each of the client terminals 21 to 2N is received via the communication control section 15; this communication control section 15 determines whether or not this authentication flag corresponds with a confirmation flag (for example, transmittable flag) attached to the updated data SP-S, SD-S on the basis of the received data transmitting request with the authentication flag; and the updated data SP-S, SD-S are transmitted to each of the client terminals 21 to 2N in accordance with a determination result. This makes it possible to strengthen countermeasures against bad analysis and modification of data to be communicated, and theft.

By adopting the method as described above, part of game data is distributed to the client terminal side while security of data with high importance related to the online game is kept high, whereby the amount of data communication between the online game server 10 and each of the client terminals 21 to 2N can be reduced and a communication load on the online game server 10 can be reduced. Therefore, it is possible to cause communication delay in progress of the game, which may occur when a lot of players access the online game server 10 at the same time, and the like to hardly occur. In addition, it is possible to reduce operations for update of the data in the case of any change in the program of the online game.

In this regard, although it has not been referred to particularly in the embodiment described above, the online game server 10 and each of the client terminals 21 to 2N execute various processes related to the online game described above (progress of the online game, execution of the tutorial mode and the like) and the data update process in accordance with control programs (including the online game program) stored in a storage apparatus (for example, the storage section 13 and the memory 33) with which the online game server 10 and each of the client terminals 21 to 2N are provided.

The present invention can be applied to an online game system in which an online game proceeds via a communication network. Therefore, the present invention is useful.

What is claimed is:

1. An online game system comprising a client terminal operated by a player and an online game server, the online game server including an online game played in the client terminal, wherein the online game server includes:
a storage that stores a server main game program for executing a main game of the online game and a server sub game program for executing a sub game of the online game, and stores server main game data to be utilized for the server main game program and server sub game data to be utilized for the server sub game program;
an updater that updates one of the server main game program, the server sub game program, the server main game data, and the server sub game data stored in the storage in accordance with a data update operation, and generates updated data in a shared library format that can be utilized in the client terminal when the updater updates one of the server sub game program and the server sub game data; and
a transmitter that transmits the updated data in the shared library format to the client terminal,
wherein the client terminal includes:
a memory that stores a client sub game program for executing the sub game of the online game and client sub game data utilized for the client sub game program, the client sub game program and the client sub game data supplied from the online game server;

a receiver that receives the updated data transmitted by the transmitter;

a rewriter that rewrites a corresponding one of the client sub game program and the client sub game data stored in the memory using the updated data received by the receiver; and a controller that, when there is a specification operational input by the player to execute the sub game, controls a progress of the sub game using one of the client sub game program and the client sub game data stored in the memory without carrying out communication with the online game server, wherein the updater does not generate the updated data in the shared library format when the updater updates one of the server main game program and the server main game data, and wherein the sub game and the main game are games different from one another.

2. The online game system according to claim 1, wherein the sub game of the server game program is executed independently of the main game of the server game program.

3. The online game system according to claim 1, wherein the online game server further includes a data transmitting request receiver that receives a data transmitting request with an authentication flag related to transmission of the updated data from the client terminal, and wherein the transmitter determines whether the authentication flag corresponds with a confirmation flag attached to the updated data on the basis of the data transmitting request with the authentication flag received by the data transmitting request receiver, and transmits the updated data to the client terminal in accordance with a determination result.

4. The online game system according to claim 1, wherein the client terminal further comprises an operated input information transmitter that transmits operated input information based on the specification operational input by the player to the online game server, and wherein, when there is the specification operational input by the player to execute the sub game, the controller replaces reference target specification information of a process to one of the server main game program and the server main game data to specification to one of the client sub game program and the client sub game data, and executes a loopback process, thereby controlling progress of the sub game.

5. The online game system according to claim 2, wherein the online game server further includes a data transmitting request receiver that receives a data transmitting request with an authentication flag related to transmission of the updated data from the client terminal, and wherein the transmitter determines whether the authentication flag corresponds with a confirmation flag attached to the updated data on the basis of the data transmitting request with the authentication flag received by the data transmitting request receiver, and transmits the updated data to the client terminal in accordance with a determination result.

6. The online game system according to claim 2, wherein the client terminal further comprises an operated input information transmitter that transmits operated input information based on the specification operational input by the player to the online game server, and wherein, when there is the specification operational input by the player to execute the sub game, the controller replaces reference target specification information of a process to one of the server main game program and the server main game data to specification to one of the client sub game program and the client sub game data, and executes a loopback process, thereby controlling progress of the sub game.

7. The online game system according to claim 3, wherein the client terminal further comprises an operated input information transmitter that transmits operated input information based on the specification operational input by the player to the online game server, and wherein, when there is the specification operational input by the player to execute the sub game, the controller replaces reference target specification information of a process to one of the server main game program and the server main game data to specification to one of the client sub game program and the client sub game data, and executes a loopback process, thereby controlling progress of the sub game.

8. The online game system according to claim 1, wherein a security level of the server main game program and the server main game data stored in the storage is higher than a security level of the server sub game program and the server sub game data stored in the storage.

* * * * *